(12) United States Patent
Mwanje et al.

(10) Patent No.: US 12,375,362 B2
(45) Date of Patent: Jul. 29, 2025

(54) APPARATUS, METHOD, AND COMPUTER PROGRAM

(71) Applicant: NOKIA SOLUTIONS AND NETWORKS OY, Espoo (FI)

(72) Inventors: Stephen Mwanje, Dorfen (DE); Abdelrahman Abdelkader, Munich (DE); Konstantinos Samdanis, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 426 days.

(21) Appl. No.: 17/954,581

(22) Filed: Sep. 28, 2022

(65) Prior Publication Data
US 2023/0097044 A1 Mar. 30, 2023

(30) Foreign Application Priority Data
Sep. 28, 2021 (EP) .................................... 21199343

(51) Int. Cl.
| | |
|---|---|
| *H04L 41/147* | (2022.01) |
| *H04L 41/0233* | (2022.01) |
| *H04L 41/0806* | (2022.01) |
| *H04L 43/08* | (2022.01) |
| *H04W 24/00* | (2009.01) |
| *H04W 52/08* | (2009.01) |

(52) U.S. Cl.
CPC ........... *H04L 41/147* (2013.01); *H04W 24/00* (2013.01); *H04W 52/08* (2013.01); *H04L 41/0233* (2013.01); *H04L 41/0806* (2013.01); *H04L 43/08* (2013.01)

(58) Field of Classification Search
CPC .............. H04L 41/147; H04L 41/0233; H04L 41/0806; H04L 43/08; H04W 52/08; H04W 24/00
See application file for complete search history.

(56) References Cited

U.S. PATENT DOCUMENTS

| | | | |
|---|---|---|---|
| 7,590,420 B1 * | 9/2009 | Zaghloul | H04W 8/12 455/435.2 |
| 2003/0120677 A1 * | 6/2003 | Vernon | G06Q 10/08 707/999.102 |
| 2017/0134237 A1 * | 5/2017 | Yang | H04L 43/16 |
| 2018/0349186 A1 | 12/2018 | Andrus et al. | |
| 2019/0393931 A1 | 12/2019 | Huang et al. | |
| 2021/0021494 A1 | 1/2021 | Yao et al. | |

(Continued)

OTHER PUBLICATIONS

Haydaya et al., "Understanding product lifecycle management and supporting systems", No. 4, 2012, Industrial Management & Data Systems, vol. 112, pp. 559-583 (Year: 2012).*

(Continued)

*Primary Examiner* — Brian J. Gillis
*Assistant Examiner* — Chhian (Amy) Ling
(74) *Attorney, Agent, or Firm* — SQUIRE PATTON BOGGS (US) LLP

(57) ABSTRACT

The disclosure relates to an apparatus comprising means for: receiving a request from an operator to instantiate a closed loop for managing a communication system; identifying closed loop components based on the request; and instantiating a closed loop for managing a communication system with the closed looped components.

16 Claims, 15 Drawing Sheets

(56) References Cited

U.S. PATENT DOCUMENTS

2023/0261946 A1* 8/2023 Vaishnavi .............. H04L 41/12
                                                     709/223
2024/0378506 A1* 11/2024 D'Oro .................... G06N 20/00

OTHER PUBLICATIONS

Vaishnavi et al., "Challenges Towards Automation of Live Telco Network Management: Closed Control Loops", Nov. 2, 2020, 2020 16th International Conference on Network and Service Management (CNSM) (2020, pp. 1-5) (Year: 2020).*

Stephen S. Mwanje, Christian Mannweiler (2020), "Towards Cognitive Autonomous Networks: Network Management Automation for 5G and Beyond", Wiley.

OODA (Observe, Orient, Decide, Act—see ETSI GR ZSM 002: "Zero-touch network and Service Management (ZSM); Reference Architecture").

Monitor, Analyse, Plan, Execute—Knowledge—see Kephart, J. and D. Chess: "The Vision of Autonomic Computing", IEEE Computer, vol. 36, No. 1, pp. 41-50, DOI 10.1109/MC.2003.1160055, Jan. 2003.

Communication under Rule 71(3) EPC dated Oct. 15, 2024, corresponding to European Patent Application No. 21199343.1.

Extended European Search Report dated Mar. 23, 2022 corresponding to European Patent Application No. 21199343.1.

Communication pursuant to Article 94(3) EPC dated Mar. 22, 2024 corresponding to European Patent Application No. 21199343.1.

3GPP TS 28.312 V0.5.0 (May 2021), Technical Specification, 3rd Generation Partnership Project; Technical Specification Group Services and System Aspects; Management and orchestration; Intent driven management services for mobile networks (Release 17), May 28, 2021, XP052016992.

3GPP TR 21.916 V16.0.1 (Sep. 2021), Technical Report, 3rd Generation Partnership Project; Technical Specification Group Services and System Aspects; Release 16 Description; Summary of Rel-16 Work Items (Release 16), Sep. 14, 2021, XP052056517.

3GPP TR 28.812 V17.1.0 (Dec. 2020), Technical Report, 3rd Generation Partnership Project; Technical Specification Group Services and System Aspects; Telecommunication management; Study on scenarios for Intent driven management services for mobile networks (Release 17), Dec. 16, 2020, XP051999977.

* cited by examiner

APPARATUS, METHOD, AND COMPUTER PROGRAM

CROSS REFERENCE TO RELATED APPLICATION

This application claims the benefit of European Patent Application No. 21199343.1, filed Sep. 28, 2021. The entire content of the above-referenced application is hereby incorporated by reference.

FIELD OF THE DISCLOSURE

The present disclosure relates to an apparatus, a method, and a computer program for instantiating (i.e. creating) a closed loop for managing a communication system.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising means for: receiving a request from an operator to instantiate a closed loop for managing a communication system; identifying closed loop components based on the request; and instantiating a closed loop for managing a communication system with the closed looped components.

The request may indicate unique identifiers of the closed loop components.

The unique identifiers of the closed loop component may comprise unique names of the closed loop components.

The request may indicate roles of the closed loop components.

The roles may comprise collecting data, analysing data, making a decision and/or executing a decision.

The request may indicates capabilities of the closed loop components.

The capabilities may comprise reading data relating to a managed object from the object or a network database and format the data and/or making a prediction based on formatted data.

The request may comprise inputs of the closed loop components and/or outputs of the closed loop components.

The request may comprise performance metrics of the closed loop components or the closed loop for managing the communication system.

Instantiating the closed loop for managing the communication system with the closed loop components may comprise: composing the closed loop for managing the communication system with the closed loop components; configuring the closed loop components; configuring the relations between the closed loop components; and/or configuring the closed loop for managing the communication system as active.

Configuring the relations between the closed loop components may comprise connecting the closed loop components.

Configuring the closed loop for managing the communication system may comprise: activating the closed loop components; and/or marking the closed loop for managing the communication system as active.

The apparatus may comprise means for: sending, to the operator, a notification indicating that the closed loop for managing the communication system has been instantiated; or sending, to the operator, a notification indicating that the closed loop for managing the communication system has not been instantiated.

Identifying the closed looped components is further based on a repository storing identifiers of closed looped components, roles of the closed loop components, capabilities of the closed loop components, inputs of the closed loop components, outputs of the closed loop components and/or performance metrics of the closed loop components.

The closed loop components may originate from different vendors.

The closed loop components may operate on different systems of the network.

The apparatus may be a closed loop control.

The closed loop control may be an automation platform or may be part of an automation platform.

According to an aspect there is provided an apparatus comprising at least one processor and at least one memory including computer code for one or more programs, the at least one memory and the computer code configured, with the at least one processor, to cause the apparatus at least to: receive a request from an operator to instantiate a closed loop for managing a communication system; identify closed loop components based on the request; and instantiate a closed loop for managing a communication system with the closed looped components.

The request may indicate unique identifiers of the closed loop components.

The unique identifiers of the closed loop component may comprise unique names of the closed loop components.

The request may indicate roles of the closed loop components.

The roles may comprise collecting data, analysing data, making a decision and/or executing a decision.

The request may indicates capabilities of the closed loop components.

The capabilities may comprise reading data relating to a managed object from the object or a network database and format the data and/or making a prediction based on formatted data.

The request may comprise inputs of the closed loop components and/or outputs of the closed loop components.

The request may comprise performance metrics of the closed loop components or the closed loop for managing the communication system.

Instantiating the closed loop for managing the communication system with the closed loop components may comprise: composing the closed loop for managing the communication system with the closed loop components; configuring the closed loop components; configuring the relations between the closed loop components; and/or configuring the closed loop for managing the communication system as active.

Configuring the relations between the closed loop components may comprise connecting the closed loop components.

Configuring the closed loop for managing the communication system may comprise: activating the closed loop components; and/or marking the closed loop for managing the communication system as active.

The at least one memory and the computer code may be configured, with the at least one processor, to cause the apparatus at least to: send, to the operator, a notification indicating that the closed loop for managing the communication system has been instantiated; or send, to the operator, a notification indicating that the closed loop for managing the communication system has not been instantiated.

Identifying the closed looped components is further based on a repository storing identifiers of closed looped components, roles of the closed loop components, capabilities of the closed loop components, inputs of the closed loop components, outputs of the closed loop components and/or performance metrics of the closed loop components.

The closed loop components may originate from different vendors.

The closed loop components may operate on different systems of the network.

The apparatus may be a closed loop control.

The closed loop controller may be an automation platform or may be part of an automation platform.

According to an aspect there is provided an apparatus comprising circuitry configured to: receive a request from an operator to instantiate a closed loop for managing a communication system; identify closed loop components based on the request; and instantiate a closed loop for managing a communication system with the closed looped components.

The request may indicate unique identifiers of the closed loop components.

The unique identifiers of the closed loop component may comprise unique names of the closed loop components.

The request may indicate roles of the closed loop components.

The roles may comprise collecting data, analysing data, making a decision and/or executing a decision.

The request may indicates capabilities of the closed loop components.

The capabilities may comprise reading data relating to a managed object from the object or a network database and format the data and/or making a prediction based on formatted data.

The request may comprise inputs of the closed loop components and/or outputs of the closed loop components.

The request may comprise performance metrics of the closed loop components or the closed loop for managing the communication system.

Instantiating the closed loop for managing the communication system with the closed loop components may comprise: composing the closed loop for managing the communication system with the closed loop components; configuring the closed loop components; configuring the relations between the closed loop components; and/or configuring the closed loop for managing the communication system as active.

Configuring the relations between the closed loop components may comprise connecting the closed loop components.

Configuring the closed loop for managing the communication system may comprise: activating the closed loop components; and/or marking the closed loop for managing the communication system as active.

The apparatus may comprise circuitry configured to: send, to the operator, a notification indicating that the closed loop for managing the communication system has been instantiated; or send, to the operator, a notification indicating that the closed loop for managing the communication system has not been instantiated.

Identifying the closed looped components is further based on a repository storing identifiers of closed looped components, roles of the closed loop components, capabilities of the closed loop components, inputs of the closed loop components, outputs of the closed loop components and/or performance metrics of the closed loop components.

The closed loop components may originate from different vendors.

The closed loop components may operate on different systems of the network.

The apparatus may be a closed loop control.

The closed loop controller may be an automation platform or may be part of an automation platform.

According to an aspect there is provided a method comprising: receiving a request from an operator to instantiate a closed loop for managing a communication system; identifying closed loop components based on the request; and instantiating a closed loop for managing a communication system with the closed looped components.

The request may indicate unique identifiers of the closed loop components.

The unique identifiers of the closed loop component may comprise unique names of the closed loop components.

The request may indicate roles of the closed loop components.

The roles may comprise collecting data, analysing data, making a decision and/or executing a decision.

The request may indicates capabilities of the closed loop components.

The capabilities may comprise reading data relating to a managed object from the object or a network database and format the data and/or making a prediction based on formatted data.

The request may comprise inputs of the closed loop components and/or outputs of the closed loop components.

The request may comprise performance metrics of the closed loop components or the closed loop for managing the communication system.

Instantiating the closed loop for managing the communication system with the closed loop components may comprise: composing the closed loop for managing the communication system with the closed loop components; configuring the closed loop components; configuring the relations between the closed loop components; and/or configuring the closed loop for managing the communication system as active.

Configuring the relations between the closed loop components may comprise connecting the closed loop components.

Configuring the closed loop for managing the communication system may comprise: activating the closed loop components; and/or marking the closed loop for managing the communication system as active.

The method may comprise: sending, to the operator, a notification indicating that the closed loop for managing the communication system has been instantiated; or sending, to the operator, a notification indicating that the closed loop for managing the communication system has not been instantiated.

Identifying the closed looped components is further based on a repository storing identifiers of closed looped components, roles of the closed loop components, capabilities of the closed loop components, inputs of the closed loop components, outputs of the closed loop components and/or performance metrics of the closed loop components.

The closed loop components may originate from different vendors.

The closed loop components may operate on different systems of the network.

The method may be performed by a closed loop control.

The closed loop control may be an automation platform or may be part of an automation platform.

According to an aspect there is provided a computer program comprising computer executable code which when run on at least one processor is configured to: receive a request from an operator to instantiate a closed loop for managing a communication system; identify closed loop components based on the request; and instantiate a closed loop for managing a communication system with the closed looped components.

The request may indicate unique identifiers of the closed loop components.

The unique identifiers of the closed loop component may comprise unique names of the closed loop components.

The request may indicate roles of the closed loop components.

The roles may comprise collecting data, analysing data, making a decision and/or executing a decision.

The request may indicates capabilities of the closed loop components.

The capabilities may comprise reading data relating to a managed object from the object or a network database and format the data and/or making a prediction based on formatted data.

The request may comprise inputs of the closed loop components and/or outputs of the closed loop components.

The request may comprise performance metrics of the closed loop components or the closed loop for managing the communication system.

Instantiating the closed loop for managing the communication system with the closed loop components may comprise: composing the closed loop for managing the communication system with the closed loop components; configuring the closed loop components; configuring the relations between the closed loop components; and/or configuring the closed loop for managing the communication system as active.

Configuring the relations between the closed loop components may comprise connecting the closed loop components.

Configuring the closed loop for managing the communication system may comprise: activating the closed loop components; and/or marking the closed loop for managing the communication system as active.

The computer program may comprise computer executable code which when run on at least one processor is configured to: send, to the operator, a notification indicating that the closed loop for managing the communication system has been instantiated; or send, to the operator, a notification indicating that the closed loop for managing the communication system has not been instantiated.

Identifying the closed looped components is further based on a repository storing identifiers of closed looped components, roles of the closed loop components, capabilities of the closed loop components, inputs of the closed loop components, outputs of the closed loop components and/or performance metrics of the closed loop components.

The closed loop components may originate from different vendors.

The closed loop components may operate on different systems of the network.

The at least one processor may be part of a closed loop control.

The closed loop controller may be an automation platform or may be part of an automation platform.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AMF: Access and Mobility Management Function
API: Application Programming Interface
BS: Base Station
CL: Closed Loop
CLC: Closed Loop Control/Controller
CP: Control Point
CU: Centralized Unit
DL: Downlink
DU: Distributed Unit
gNB: gNodeB
F: False
GSM: Global System for Mobile communication
HSS: Home Subscriber Server
IOC: Information Object Class
IoT: Internet of Things
KPI: Key Performance Indicator
LTE: Long Term Evolution
M: Mandatory
MAC: Medium Access Control
MnF: Management Function
MnS: Management Service
MS: Mobile Station
MTC: Machine Type Communication
NEF: Network Exposure Function
NF: Network Function
NR: New radio
NRF: Network Repository Function
O: Optional
PDU: Packet Data Unit PM: Performance Management
RAM: Random Access Memory
(R)AN: (Radio) Access Network
ROM: Read Only Memory
SDK: Software Development Kit
SMF: Session Management Function
T: True
TR: Technical Report
TS: Technical Specification
UE: User Equipment
UMTS: Universal Mobile Telecommunication System
3GPP: 3$^{rd}$ Generation Partnership Project
5G: 5$^{th}$ Generation
5GC: 5G Core network
5GS: 5G System

BRIEF DESCRIPTION OF THE FIGURES

Embodiments will now be described, by way of example only, with reference to the accompanying Figures in which.

Figure 8:
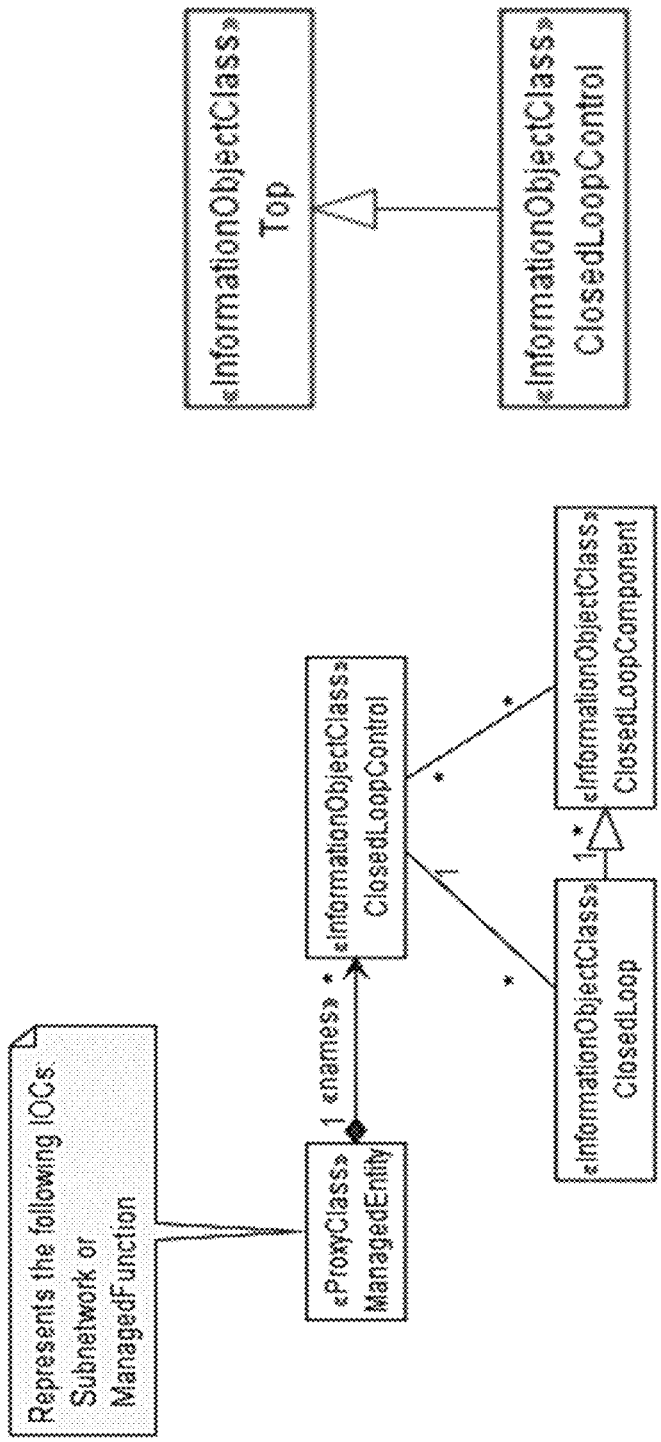
Figure 9:
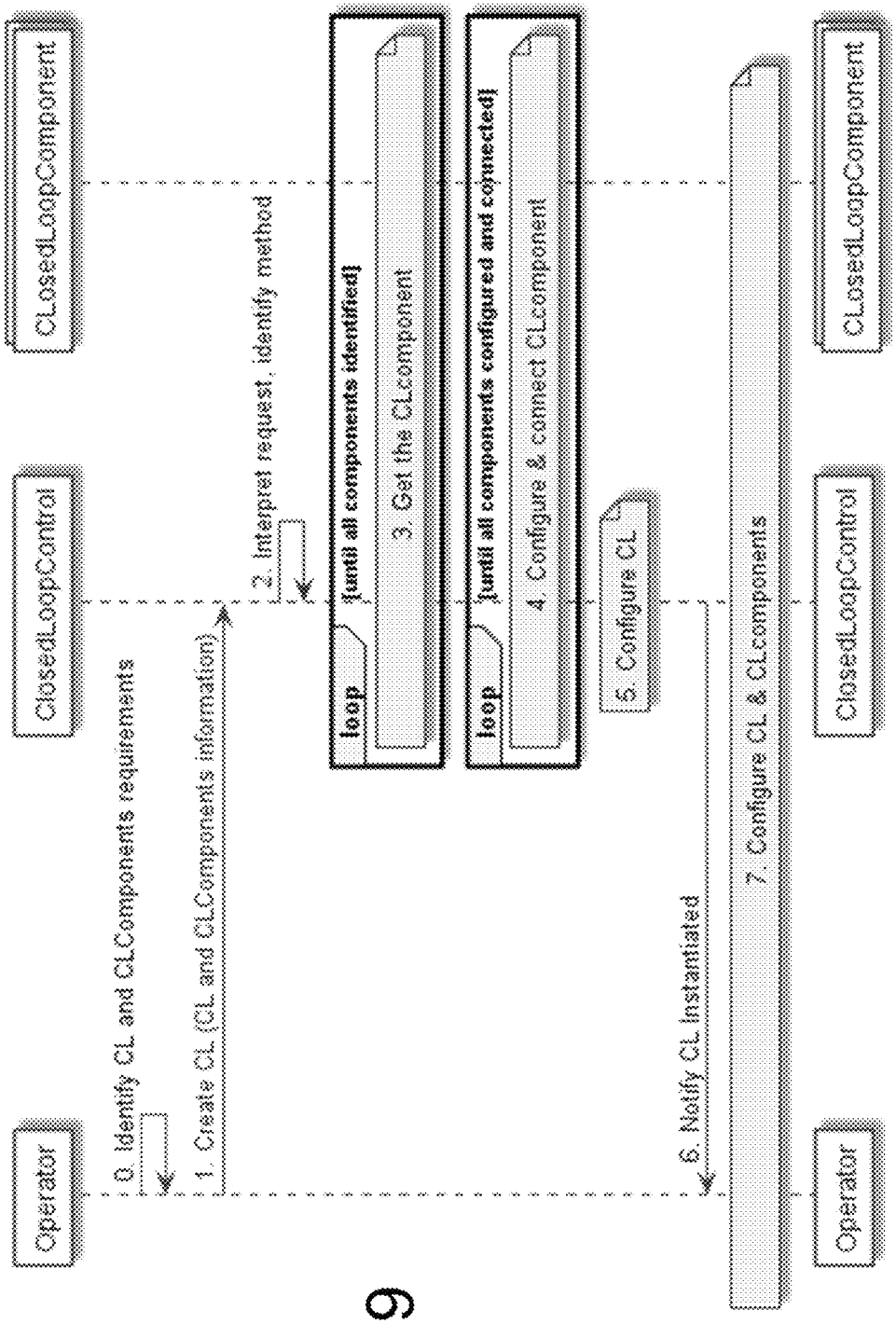
Figure 10:
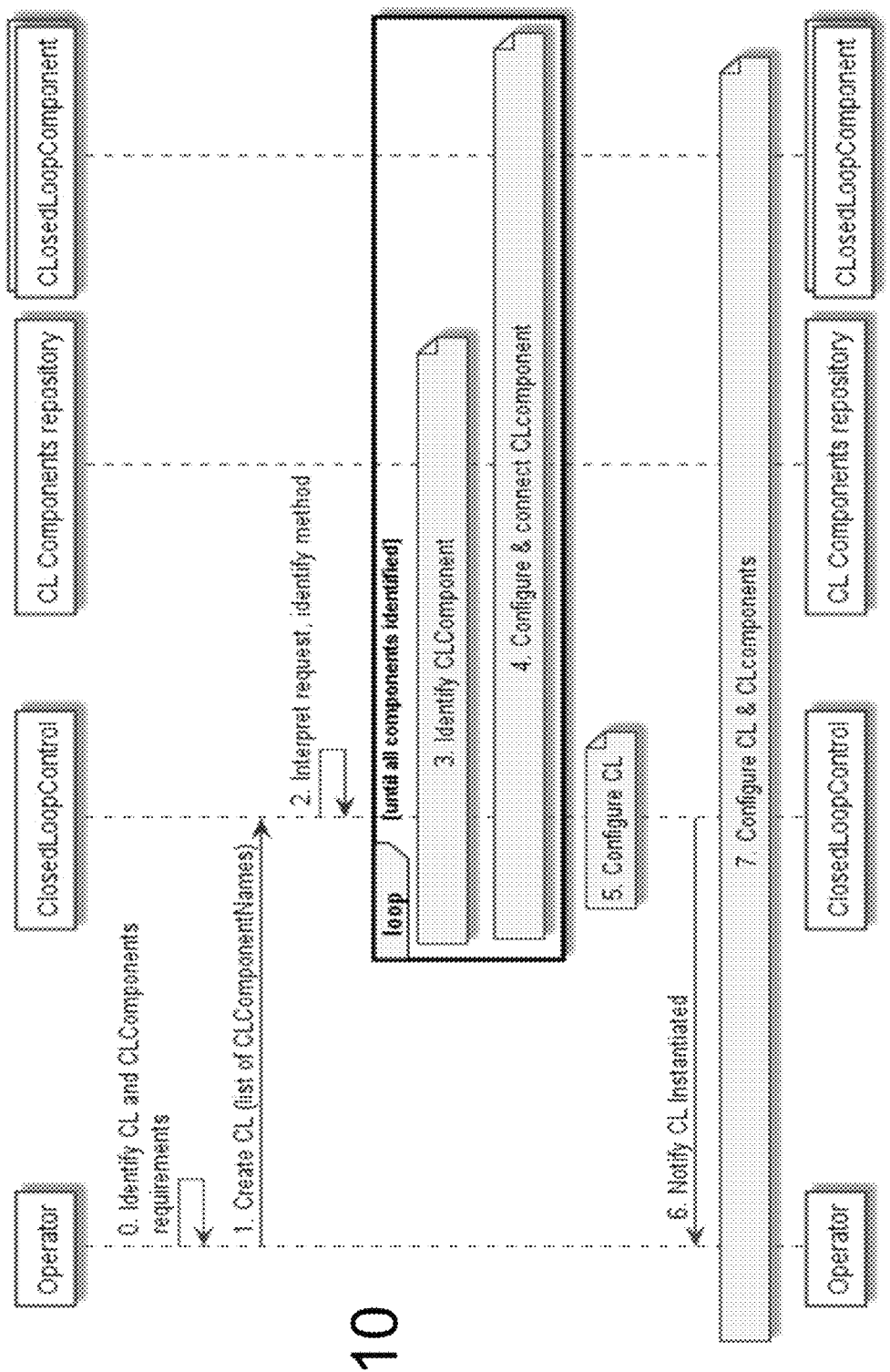
Figure 11:
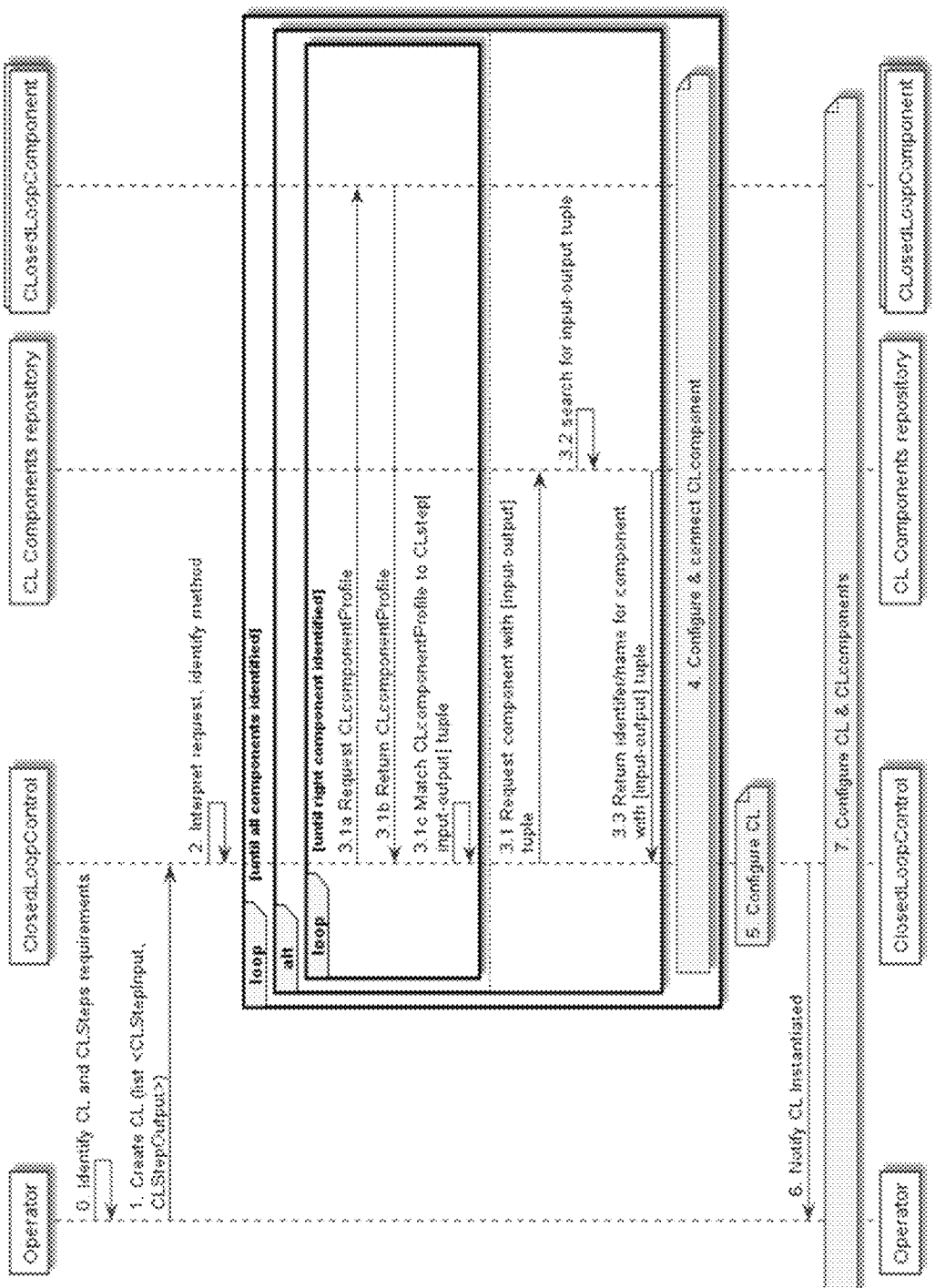
Figure 12:
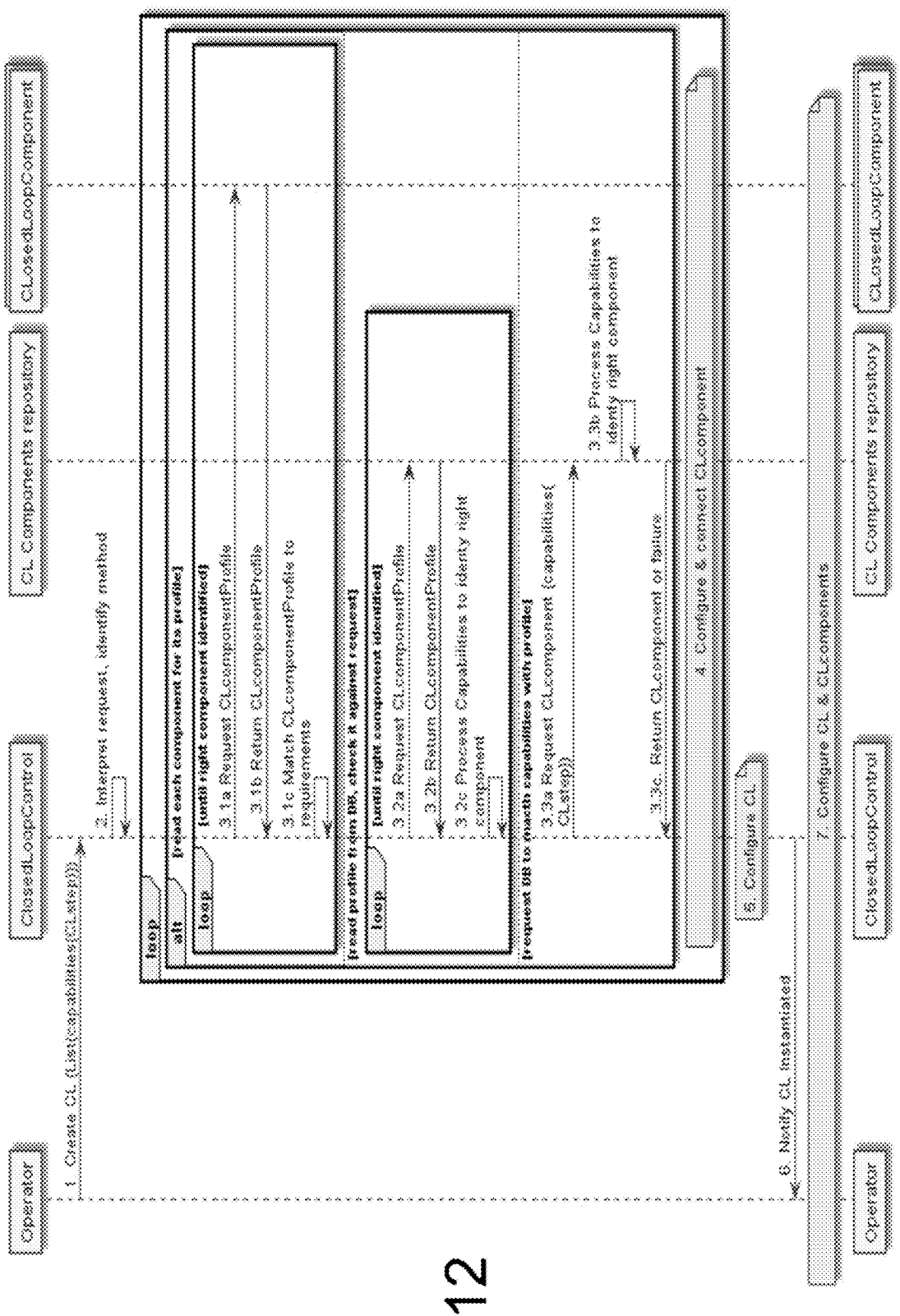
Figure 13:
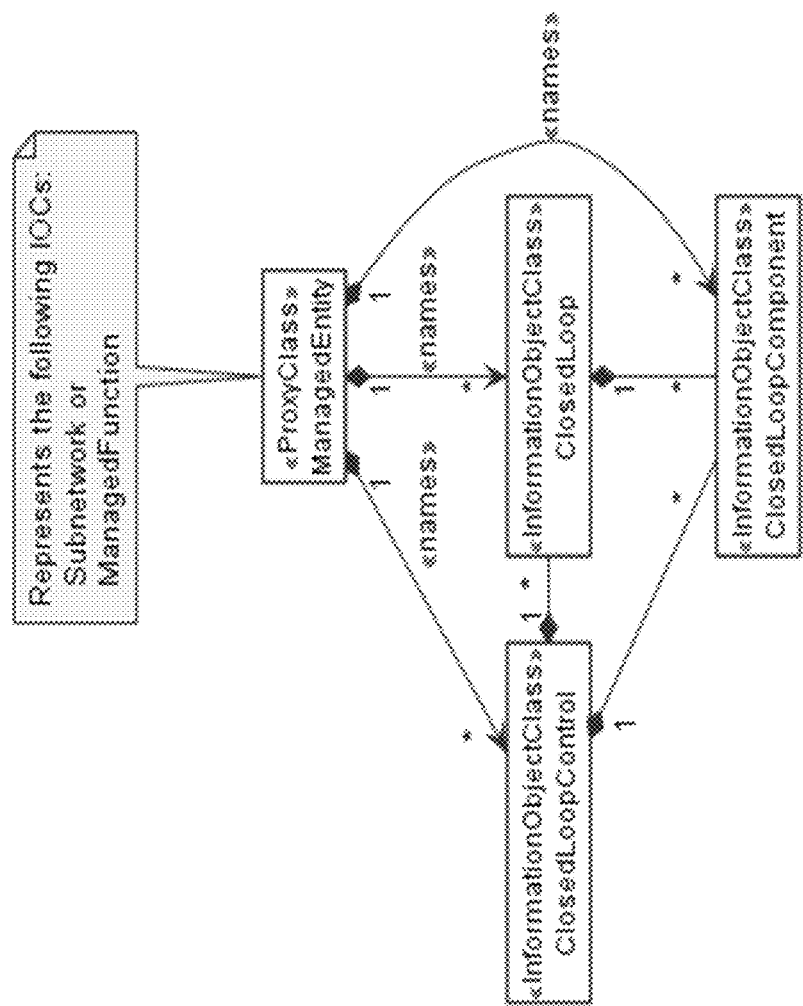
Figure 14:
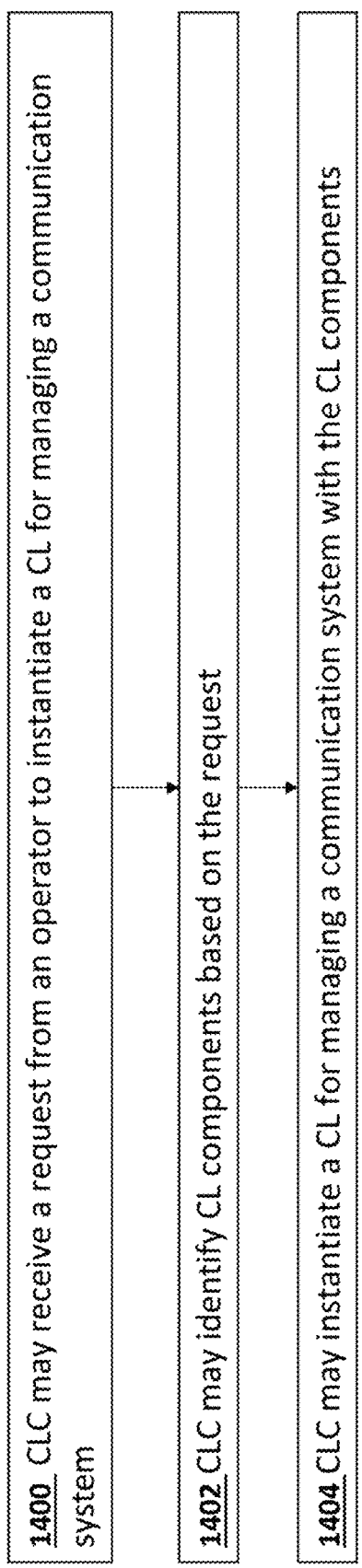
Figure 15:
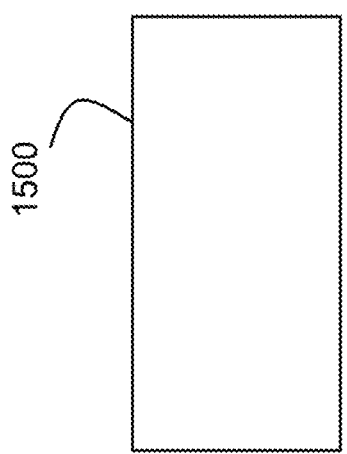

Each of FIGS. 8a and 8b shows a schematic representation of a closed loop control network resource management fragment;

FIG. 9 shows a signalling diagram of a first process for instantiating (i.e. creating) a closed loop for managing a communication system;

FIG. 10 shows a signalling diagram of a second process for instantiating (i.e. creating) a closed loop for managing a communication system;

FIG. 11 shows a signalling diagram of a third process for instantiating (i.e. creating) a closed loop for managing a communication system;

FIG. 12 shows a signalling diagram of a fourth process for instantiating (i.e. creating) a closed loop for managing a communication system;

FIG. 13 shows a schematic representation of a closed loop control network resource management fragment;

FIG. 14 shows a block diagram of a method for instantiating (i.e. creating) a closed loop for managing a communication system performed by a closed loop control; and FIG. 15 shows a schematic representation of a non-volatile memory medium storing instructions which when executed by a processor allow a processor to perform one or more of the steps of the method of FIG. 14.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
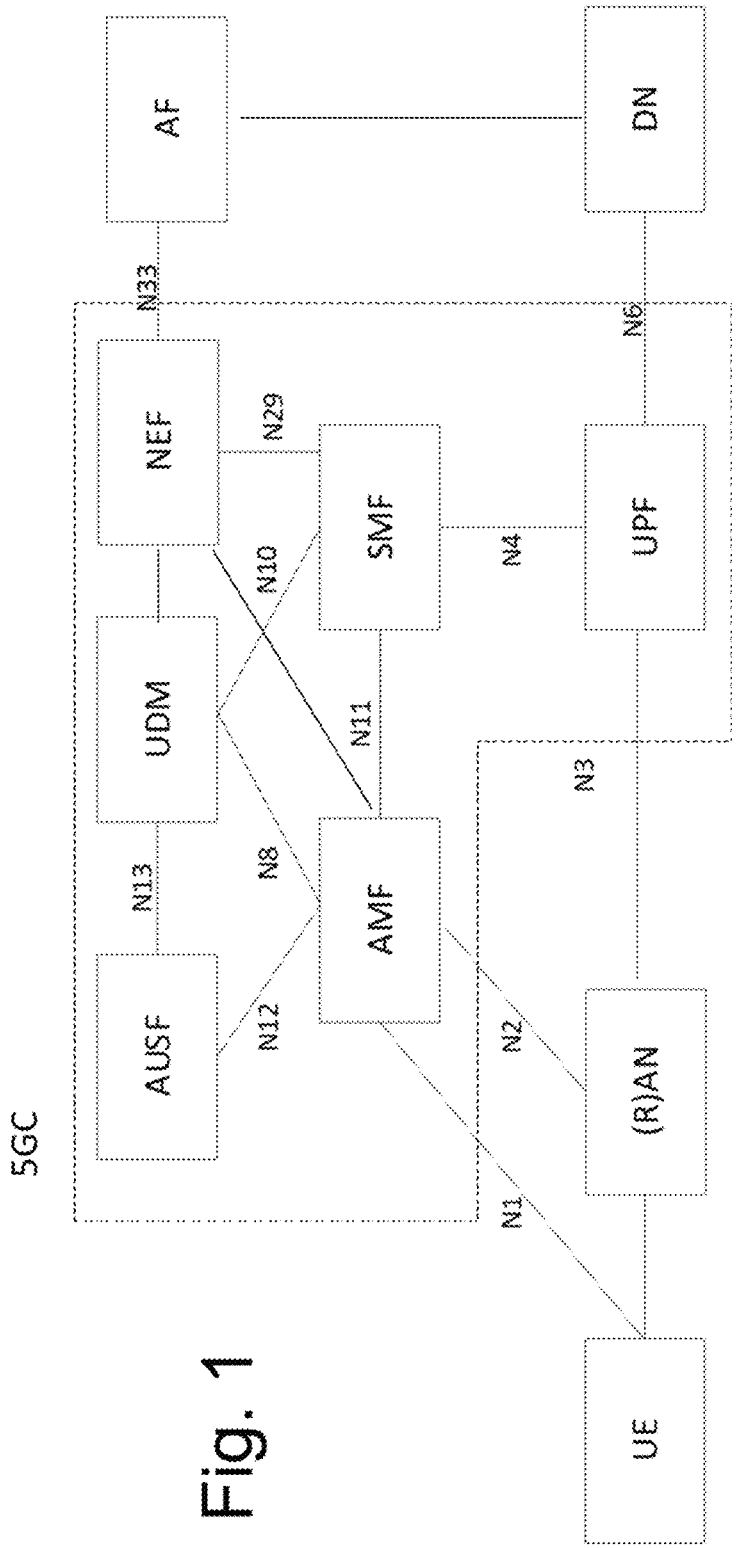
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a network exposure function (NEF). The 5GC may comprise other network functions (NF) non-illustrated such as an automation platform implementing a control loop controller (CLC).

Figure 2:
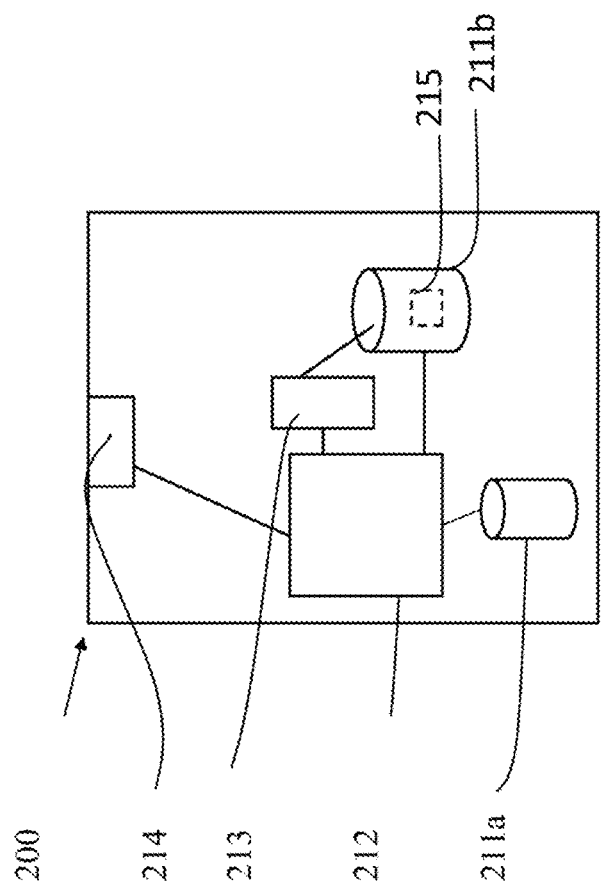
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
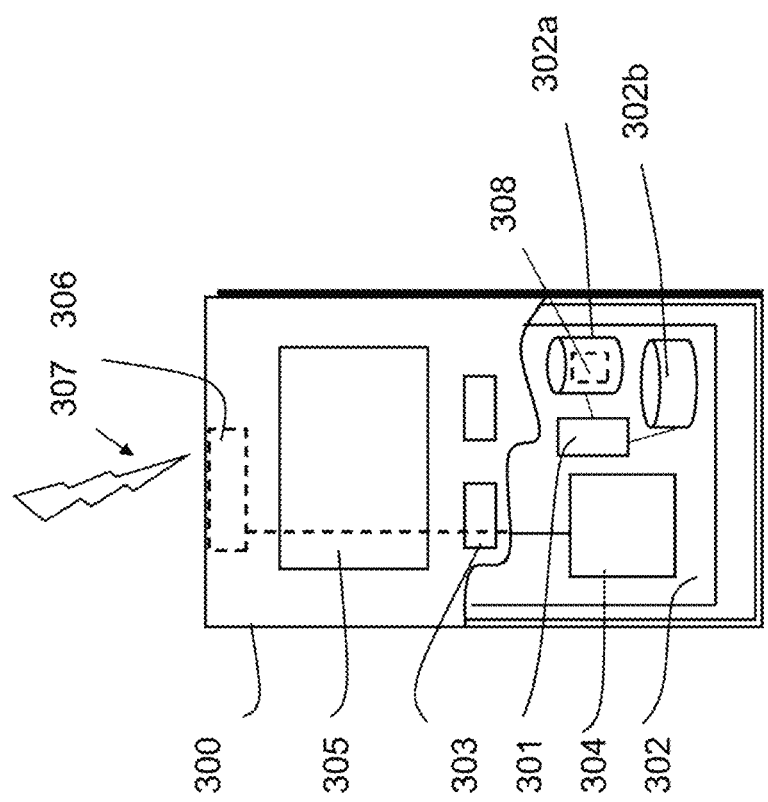
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

One or more aspects of this disclosure relate to techniques for automatically instantiating (i.e. creating) a closed loop (CL) in a communication system. The communication may be a mobile system, such as a 5G system or a future generation system.

A CL may refer to a control theory concept based on the sequence below:
1) observe an event from an underlying process or system,
2) interpret and analyze the event to create an insight,
3) decide, select or recommend an action based on the insight,
4) execute the action onto the underlying process or system and
5) receive feedback on the effect of the action on the process or system.

A CL may be executed once, terminating execution after receiving feedback. A CL may be executed multiple times. A CL may also be executed a finite number of times or an infinite resulting in what is called an infinite loop.

A CL may refer to the control theory concept as such or to a logical entity implementing the control theory concept. The logical entity may comprise one or more CL components.

Figure 4:
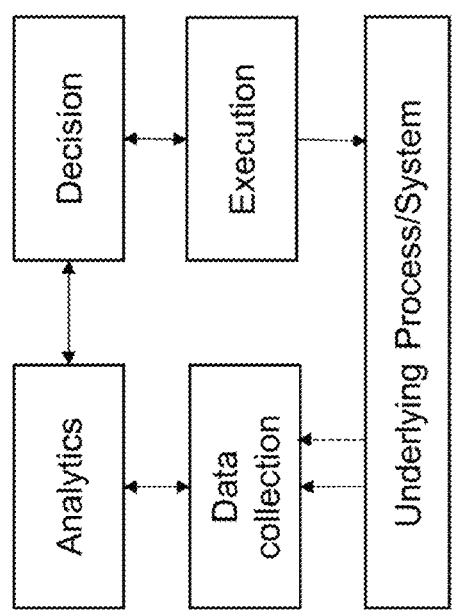
FIG. 4 shows a schematic representation of a closed loop comprising four closed loop components.

FIG. 4 shows a schematic representation of a CL comprising four CL components chained to form a loop (see Stephen S. Mwanje, Christian Mannweiler (2020), "Towards Cognitive Autonomous Networks: Network Management Automation for 5G and Beyond", Wiley). The four CL components may comprise a data collection CL component, an analysis component, a decision component and an execution component. It will be understood that the CL may comprise less than four CL components or more than four components.

A CL management function (MnF) may refer to a logical entity that interacts with a network (or network resources) to capture or monitor data about a network event and to act on the network (or the network resources).

A CL MnF may comprise a CL and a control point (CP) via which the CL MnF may be managed or controlled (i.e. a point which supports interaction with external entities). The CL MnF may provide a control interface through which external entities may manage or control the CL MnF as well as an exposure interface through which the CL MnF may expose characteristics of the CL towards external entities. Note that the CP may be implemented as a standalone component within the CL MnF or as part of the CL components specially as part of the decision CL component.

Figure 5:
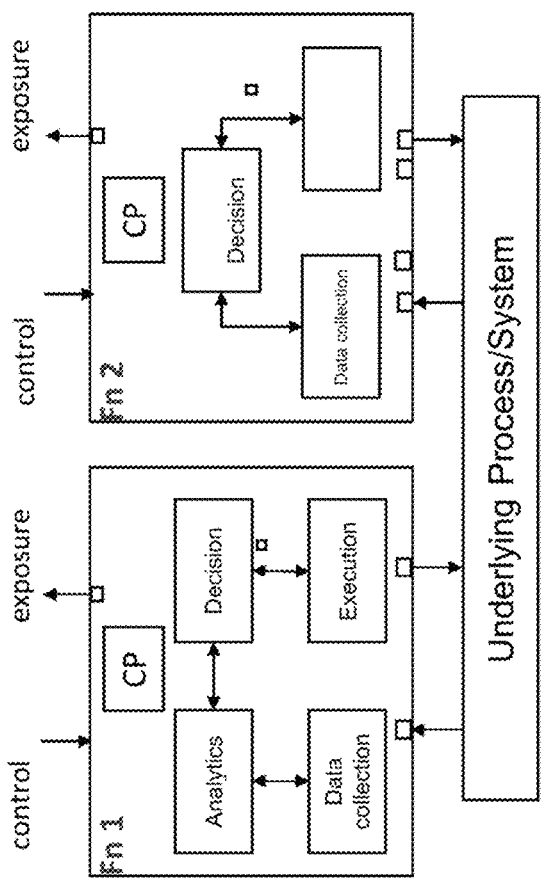
FIG. 5 shows a schematic representation of a closed loop management function with a closed loop comprising four closed loop components and a control point and another closed loop management function with a closed loop comprising three closed loop components and a control point.

FIG. 5 shows a schematic representation of an MnF Fn1 with a CL comprising four closed loop components (the analysis CL component and the analysis CL component are separate) and a control point and another MnF Fn2 with a CL comprising three closed loop components (the analysis CL component and the analysis CL component are combined).

It is important to note that a CL is not necessarily based on the above sequence of operations 1) to 5). A CL may be based on a different sequence, such as MAPE-K (Monitor, Analyse, Plan, Execute—Knowledge—see Kephart, J. and D. Chess: "The Vision of Autonomic Computing", IEEE Computer, vol. 36, no. 1, pp. 41-50, DOI 10.1109/MC.2003.1160055, January 2003) or OODA (Observe, Orient, Decide, Act—see ETSI GR ZSM 002: "Zero-touch network and Service Management (ZSM); Reference Architecture").

Although on FIG. 5 the CL MnF Fn1 and Fn2 are represented as separate logical entities with separate control interfaces and exposure interfaces this may not always be the case. Multiple CL MnFs may be implemented as combinations of different CL components in a single entity (e.g. in a single application) with a single control interface and a single exposure interface.

An example may be the application Nokia NetACT. Nokia NetACT may implement different CL components for data collection such as the simple network management protocol mediation, for analysis such as the monitor, for decision making such as the performance manager as well as for execution of network configurations such as the configurator. The CL components may be combined to compose a separate CL MnFs. With Nokia NetACT multi-vendor interactions may only be required for the control interface and the exposure interface. That is, Nokia NetACT may interact with external entities from Nokia or from another vendor via the control interface and the exposure interface.

There is a push however for multi-vendor network automation environments. For example, Nokia EdenNet seeks to support third party applications by providing a software development kit (the EdenNet SDK) through which third-party vendors may develop modules that can be executed on EdenNet. This supports specific modules for accomplishing certain tasks, for example providing a specific customized analysis on some indicated data. It however requires close integration, for example the third-party vendor shall co-develop the application using EdenNet SDK. Yet because of intellectual property concerns, the vendors may not be willing to open their developments by using a common development kit. Instead, the eventual implementation is likely to be a platform through which multi-vendor CLs are integrated without the need for a shared development.

Figure 6:
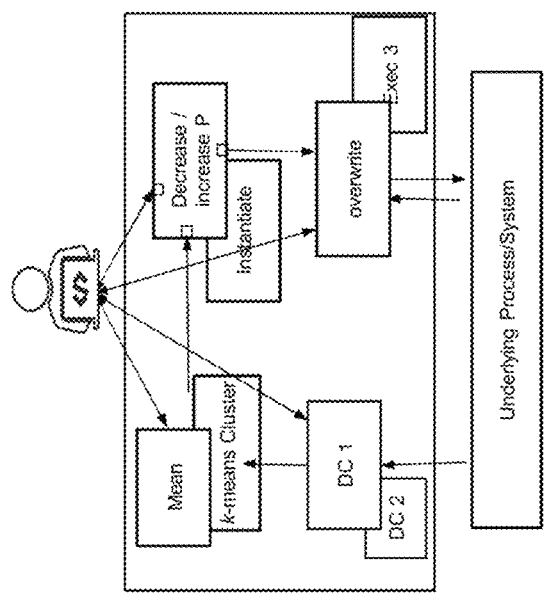
FIG. 6 shows a schematic representation of a manually integrated and managed multi-vendor closed loop (i.e. closed loop comprising closed loop component originating from multiple vendors)

A CL may be a multi-vendor CL. That is, a CL may be composed from multi-vendor CL components using standardised APIs. However, these APIs are currently not available. As illustrated by FIG. 6, the different CL components implement control interfaces and exposure interfaces, through which an external entity may control the CL components. These control interfaces and exposure interfaces are not yet explored. Each CL component may also implement run-time interfaces through which the CL components may exchange data to accomplish the network management tasks.

Typically, a common implementation may assume that a multi-vendor CL is integrated and managed by a (human) operator manually. However, given the likely large number of CLs that may be instantiated (i.e. created) on a given network, it would be a heavy task for an operator to manage the CLs. Instead another means is needed to automate the management operations. The question then is how to automatically instantiate (i.e. create) multi-vendor CLs while leveraging standardized APIs.

One or more aspects of this disclosure provide techniques for automatically instantiating a CL in an efficient way. More specifically, one or more aspects of this disclosure provide techniques for automatically instantiating a CL while leverage the 3GPP SA5 APIs.

One or more aspects of this disclosure shed light on the APIs, which enable different CL components to implement control interfaces and exposure interfaces.

There has been discussions in standards groups for whitebox deployments, where CL components are not pre-integrated or pre-selected and combined by the respective vendors, but where CL can be instantiated (i.e. created) by combining CL components from different vendors. However, no mechanism has been provided to achieve this.

Figure 7:
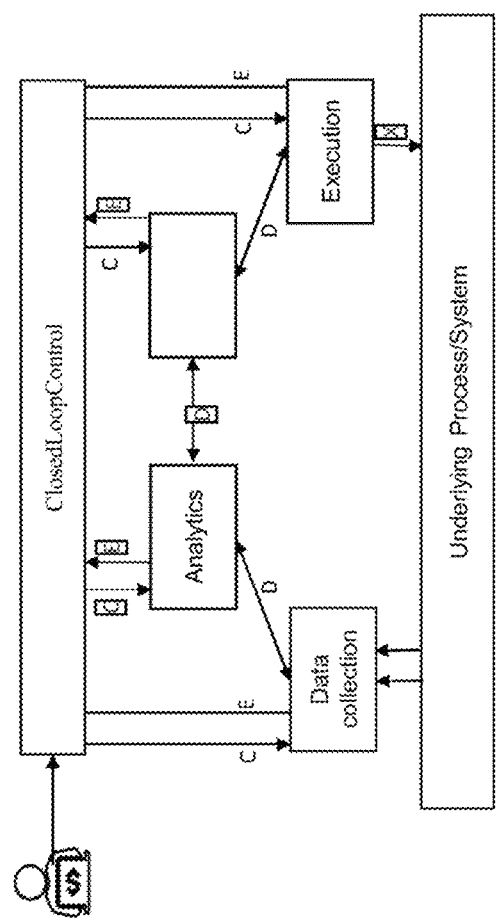
FIG. 7 shows a schematic representation of an automatically integrated and managed multi-vendor closed loop (i.e. closed loop comprising closed loop component originating from multiple vendors)

On or more aspect of this disclosure provide a CL control/controller (CLC) that is responsible for identifying CL components based on an input provided by an operator and instantiating a CL with the CL components. The CLC may replaces the operator for identifying CL components and instantiating a CL with the CL components the CL as illustrated on FIG. 7.

The CLC may be an automation platform or a part of an automation platform.

The operator may send a request to the CLC to instantiate a CL. The request may comprise information (input from the operator) that allows the CLC to identify CL components and instantiate a CL with the CL components. There may be four possible methods that may be used by the CLC to identify the CL components.

In a first method using CL components identifiers, the operator may know (e.g. via pre-arrangement per use case, capabilities and/or roles) the exact CL components which need to compose a CL. In that case, the operator may identify the CL components, for example using their unique identifiers (e.g. unique names such as Calculate_mean or Statistical_analysis). The operator may define the roles (e.g. Data collection, Analysis, Decision, execution) of the CL components. The operator may provide the unique identifiers and roles in a request sent to the CLC. The operator may use a hash function. An example of a hash function may be:

```
{
  Data collection - function ABC,
  Analysis - function AXC,
  Decision - function GBC,
  Execution - function XDF
}
```

In a second method using CL components inputs and/or outputs, the operator may not know the exact CL components which need to compose a CL. However, the operator may know the inputs (e.g. tuple) to be used by the CL components and/or outputs (e.g. tuple) to be generated by the CL components. In that case, the operator may identify the inputs and/or outputs of the CL components. The operator may define the roles (e.g. Data collection, Analysis, Decision, execution) of the CL components. The operator may provide the inputs and/or outputs of the CL components and the roles of the CL components in a request sent to the CLC. The operator may use a hash function. An example of a has function may be:

```
{
  Data collection - cell identifiers,
  Analysis - handover measurements counters data,
  Decision - handover failure statistics,
  Execution - radio resource control configurations
}
```

In a third method using CL components capabilities, the operator may not know the exact CL components which need to compose a CL. Also, the operator may not know the inputs (e.g. tuple) to be used by the CL components and outputs (e.g. tuple) to be generated by the CL components. However, the operator may know the capabilities (e.g. reading data relating to the performance of a cell from a network database and format the data and/or making a prediction based on formatted data) of the CL components (or a subset of them). In that case, the operator may identify the capabilities of the CL components. The operator may define the roles (e.g. Data collection, Analysis, Decision, execution) of the CL components. The operator may provide the capabilities of the CL components and the roles of the CL in a request sent to the CLC. The operator may use a hash function. An example of a hash function may be:

```
{
  Data collection - capability: collects and formats handover performance
    data as a time series,
  Analysis - capability: derives insight about the state of handover
    performance and possible suggest recommendations,
  Decision - capability: derives actions intended to improve handover for
    a given object (cell or group of cells),
  Execution - capability: implements actions related to cell handover
    performance e.g. on TTT and CIO
}
```

In a fourth method using a combination of CL components inputs, outputs and/or capabilities, the operator may not know the exact CL components which need to compose a CL. However, the operator may know the inputs (e.g. tuple) to be used by the CL components, outputs (e.g. tuple) to be generated by the CL components and/or the capabilities (e.g. reading data relating to the performance of a cell from a network database and format the data and/or making a prediction based on formatted data) of the CL components (or a subset of them). The operator may provide the capabilities of the CL components and the inputs of the CL components as the input in a request sent to the CLC. The operator may provide the capabilities of the CL components and the outputs of the CL components as the input in a request sent to the CLC. The operator may provide the capabilities of the CL components, the inputs and the outputs of the CL components in a request sent to the CLC. The operator may use a hash function. An example of a hash function may be a combination of the above has functions.

The operator may trigger the instantiation of the CL for example using the createMOI procedure defined by 3GPP SA5.

The CLC may identify the CL components to compose the CL based on the unique identifiers of the CL components, inputs and outputs of the CL components, roles of the CL components and/or capabilities of the CL component indicated by the operator in the request.

The CLC may identify the CL components to compose the CL based on assurance expectations of the CL components or the CL (e.g. expressed in form of a CL goal, which can be decomposed into assurance performance metrics such as delay, throughput, etc). The information may be provided using a hash function.

The CLC may configure the CL components. The CLC may configure the relation and data exchange among the CL components. For example, the CLC may configure the data collection CL component to deliver data to the analytics CL component. The CLC may configure the analytics CL component to collect data from the data collection CL component whenever such data is needed to compute analytics. The CLC may configure the analytics CL component to deliver data to the decision CL component. The CLC may configure the decision CL component to request and collect data in the form of an analytics report from the analytics CL component whenever such data is needed to derive a decision. The CLC may configure the decision CL component to deliver data in form of recommended actions or commands to the execution CL component. The CLC may configure the execution CL component to collect data in form of a set of recommended actions from the decision CL component whenever such recommendations are needed. The CLC may configure the execution component to implement the recommended actions on to the network once received or upon certain conditions (e.g. threshold surpass). The CLC may configure the CL components to provide performance management (PM), key performance indicator (KPI) and/or feedback data on their operations.

The CLC may be modelled as a logical entity that receives and fulfils the requests to instantiate the CL for example using the createMOI procedure.

The section below depicts the set of classes that encapsulates the information relevant for this management service (MnS) and provides an overview of the relationships between relevant classes in UML.

Each of FIGS. 8*a* and 8*b* shows a schematic representation of a CLC network resource management fragment.

FIG. 9 shows a signalling diagram of a first process for instantiating (i.e. creating) a CL for managing a communication system.

In step 0 the operator may identify and compile information to be provided to the CLC to identify CL components and instantiate (i.e. create) a CL with the CL components. The information may comprise unique identifiers (e.g. unique names) of the CL components, inputs of the CL components, outputs of the CL components, roles of the CL components and/or capabilities of the CL components. The information may further comprise assurance expectations of the CL components or the CL (e.g. expressed in form of a CL goal, which can be decomposed into assurance performance metrics such as delay, throughput, etc.). The information may be provided using a hash function.

In step 1 the operator may send a request to the CLC to instantiate (i.e. create) a CL. The request may provide the information that may be used by the CLC to identify CL components and then instantiate the CL.

In step 2 the CLC may interpret the information. The CLC may determine how the CL components should be identified based on the information. For example, if the information comprises the unique identifiers of the CL components then the CLC may determine that the CL components identified by the unique identifiers should be identified. If the information only comprises inputs and outputs of the CL components then the CLC may determine that CL components matching the inputs and outputs of the CL components provided by the operator should be identified.

In step 3 the CLC may identify the CL components based on the information. The CLC may identify the CL components based on a repository that holds available CL components. The CLC may then compose the CL with the identified CL components.

It will be understood that the CL components may operate on different systems of the network (e.g. a CL component may operate on a management data analytics platform or function while another CL component may be operate on a cognitive self organizing network server. In such a case the CLC may identify the systems where the CL components should operate. The repository may integrated within the CLC in which case step 2 may be internal within the CLC.

In step 4 the CLC configure the CL component. The CLC may configure the relation and data exchange among the CL components.

In step 5 the CLC may configure the CL. For example, the CLC may activate the CL components. The CLC may mark the CL as active.

In step 6 the CLC may send a notification to the operator indicating that the CL has been instantiated (i.e. created). Alternatively, the CLC may send a notification to the operator indicating that the CL has not been instantiated (i.e. created).

In step 7 the operator may further configure the CL or the CL components.

FIG. 10 shows a signalling diagram of a second process for instantiating (i.e creating) a CL for managing a communication system.

Each CL component may be identified by a unique identifier (e.g. unique name). In a scenario the operator may know the unique identifiers of the CL components.

In step 0 the operator may identify and compile information to be provide to the CLC to identify CLC components and instantiate (i.e. create) a CL with the CL components. The information may comprise unique identifiers (e.g. unique names) of the CL components and roles of the CL components. The information may be provided using a hash function.

In step 1 the operator may send a request to the CLC to instantiate (i.e. create) a CL. The request may provide the information that may be used by the CLC to identify CL components and then instantiate the CL.

In step 2 the CLC may interpret the information. The CLC may determine how the CL components should be identified based on the information. Here, the information comprises the unique identifiers of the CL components then the CLC may determine that CL components identified by the unique identifiers provided by the operator should be identified.

In step 3 the CLC may identify the CL components based on the information. The CLC may identify the CL components based on a repository that holds available CL components and/or based on pre-configuration arrangements. The CLC may then compose the CL with the identified CL components.

The CL components may operate on different systems of the network (e.g. a CL component may operate on a management data analytics platform or function while another CL component may be operate on a cognitive self organizing network server. In such a case the CLC may identify the systems where the CL components should operate. The repository may be integrated within the CLC in which case step 2 may be internal within the CLC.

In step 4 the CLC configure the CL component. The CLC may configure the relation and data exchange among the CL components.

In step 5 the CLC may configure the CL. For example, the CLC may activate the CL components. The CLC may mark the CL as active.

In step 6 the CLC may send a notification to the operator indicating that the CL has been instantiated (i.e. created).

Alternatively, the CLC may send a notification to the operator indicating that the CL has not been instantiated (i.e. created).

In step 7 the operator may further configure the CL or the CL components.

FIG. 11 shows a signalling diagram of a third process for instantiating (i.e. creating) a CL for managing a communication system.

Each CL component may be identified by a unique identifier (e.g. unique name). Each CL component may be identified by inputs used by the CL component and/or outputs generated by the CL component. In a scenario the operator may not know the unique identifiers of the CL components but may know the inputs and/or outputs of the CL components.

For example a Vendor_x data collection component may use performance management data as inputs and may generate formatted data (e.g. time series) as outputs. In this way, if the operator wishes to instantiate (i.e. create) a CL comprising a data collection component that uses performance management data as inputs and generating formatted data (e.g. time series) as outputs, then the CLC may identify the Vendor_x data collection component.

Similarly a Vendor_y analytics and decision component may use formatted data as inputs and may generate decisions as outputs. In this way, if the operator wishes to instantiate a CL comprising an analytics and decision component that uses formatted data as inputs and generating decisions as outputs, then the CLC may identify the Vendor_y analytics and decision component.

The CLC may be configured to identify CL components matching inputs and/or outputs of the CL components provided by the operator.

In step 0 the operator may identify and compile information to be provide to the CLC to identify CLC components and instantiate (i.e. create) a CL with the CL components. The information may comprise inputs and/or outputs of the CL components and roles of the CL components. The information may be provided using a hash function. The inputs and/or outputs of the CL components may be ordered such that the position of the inputs and/or outputs of the CL components is indicative of the role of the CL components. For example, the first inputs and/or outputs of a CL component may correspond to a data collection CL component, the second inputs and/or outputs of a CL component may correspond to an analysis CL component, the third inputs and/or outputs of a CL component may correspond to a decision CL component and the fourth inputs and/or outputs of a CL component may correspond to an execution CL component In step 1 the operator may send a request to the CLC to instantiate (i.e. create) a CL. The request may provide the information that may be used by the CLC to identify CL components and then instantiate (i.e. create) the CL.

In step 2 the CLC may interpret the information. The CLC may determine how the CL components should be identified based on the information. Here, the information comprises the inputs and/or outputs of the CL components then the CLC may determine that CL components matching the inputs and outputs of the CL components provided by the operator should be identified.

In step 3 the CLC may identify the CL components based on the information. The CLC may identify the CL components based on a repository that holds available CL components and/or based on pre-configuration arrangements. The CLC may then compose the CL with the identified CL components.

The CL components may operate on different systems of the network (e.g. a CL component may operate on a management data analytics platform or function while another CL component may be operate on a cognitive self organizing network server. In such a case the CLC may identify the systems where the CL components should operate. The repository may be integrated within the CLC in which case step 2 may be internal within the CLC.

In step 4 the CLC configure the CL component. The CLC may configure the relation and data exchange among the CL components.

In step 5 the CLC may configure the CL. For example, the CLC may activate the CL components. The CLC may mark the CL as active.

In step 6 the CLC may send a notification to the operator indicating that the CL has been instantiated (i.e. created). Alternatively, the CLC may send a notification to the operator indicating that the CL has not been instantiated (i.e. created).

In step 7 the operator may further configure the CL or the CL components.

FIG. 12 shows a signalling diagram of a fourth process for instantiating (i.e. creating) a CL for managing a communication system.

Each CL component may be identified by a unique identifier (e.g. unique name). Each CL component may be identified by inputs used by the CL component and/or outputs generated by the CL component. Each CL component may be identified by capabilities of the CL component. In a scenario the operator may not know the unique identifiers of the CL components, the operator may not know the inputs and outputs of the CL components but the operator may know the capabilities of the CL components.

For example, the capabilities of a data collection CL component may comprise reading the performance of a cell from network databases and providing the PM data formatted into an hourly time series. The capabilities of an analytics CL component may comprise using a time series of historical cell performance and providing predictions of the likely performance in the next x hours. The value of x may be configurable by the consumer of the analytics. The capabilities of the decision CL component may comprise using a particular kind data and format from and making a decision.

The CLC may be configured to identify CL components matching capabilities of the CL components provided by the operator.

In step 0 the operator may identify and compile information to be provide to the CLC to identify CL components and instantiate (i.e. create) a CL with the CL components. The information may comprise capabilities of the CL components and/or roles of the CL components. The information may be provided using a hash function. The capabilities of the CL components may be ordered such that the position of the capabilities of the CL components is indicative of the role of the CL components. For example, the first capabilities of a CL component may correspond to a data collection CL component, the second capabilities of a CL component may correspond to an analysis CL component, the third capabilities of a CL component may correspond to a decision CL component and the fourth capabilities of a CL component may correspond to an execution CL component In step 1 the operator may send a request to the CLC to instantiate (i.e. create) a CL. The request may provide the information that may be used by the CLC to identify CL components and then instantiate (i.e. create) the CL.

In step 2 the CLC may interpret the information. The CLC may determine how the CL components should be identified based on the information. Here, the information comprises the capabilities of the CL components then the CLC may determine that CL components matching the capabilities of the CL components provided by the operator should be identified.

In step 3 the CLC may identify the CL components based on the information. The CLC may identify the CL components based on a repository that holds available CL components and/or based on pre-configuration arrangements. The CLC may then compose the CL with the identified CL components.

The CL components may operate on different systems of the network (e.g. a CL component may operate on a management data analytics platform or function while another CL component may operate on a cognitive self organizing network server. In such a case the CLC may identify the systems where the CL components should operate. The repository may be integrated within the CLC in which case step 2 may be internal within the CLC.

In step 4 the CLC configure the CL component. The CLC may configure the relation and data exchange among the CL components.

In step 5 the CLC may configure the CL. For example, the CLC may activate the CL components. The CLC may mark the CL as active.

In step 6 the CLC may send a notification to the operator indicating that the CL has been instantiated (i.e. created). Alternatively, the CLC may send a notification to the operator indicating that the CL has not been instantiated (i.e. created).

In step 7 the operator may further configure the CL or the CL components.

It may be helpful to have a full description of the CL components to facilitate identification of the CL components on the repository. The CL component related information model of FIG. 13 may be used.

The CL component information object class (IOC) may represent the properties of an abstract CL component. The CL component IOC may include attributes inherited from a top IOC (defined in TS 28.622) and one or more of the attributes listed in table 1. The definition of these attributes is provided table 2.

TABLE 1

| Attribute Name | Support Qualifier | isReadable | isWritable | isInvariant | isNotifyable |
|---|---|---|---|---|---|
| CLComponentName | M | T | F | T | T |
| CLComponentProfile | O | T | F | F | T |
| CLComponentInput | M | T | F | F | T |
| CLComponentOutput | M | T | F | F | T |
| CLComponentState | M | T | F | F | T |

TABLE 2

| Attribute Name | Documentation and Allowed Values | Properties |
|---|---|---|
| CLComponentName | A user-friendly (and user assignable) name of the input paraemeter. allowedValues: Not Applicable | type: String multiplicity: 1 isOrdered: False isUnique: False defaultValue: None isNullable: False |
| CLComponentProfile | It describes the task aspect of the intent that shall be accomplished. allowedValues: Not Applicable | type: String multiplicity: 1 isOrdered: False isUnique: False defaultValue: None isNullable: False |
| CLComponentInputs | It describes the inputs to the CLComponent, as an array for which each entry is one input allowedValues: Not Applicable | type: Object multiplicity: 1 isOrdered: False isUnique: False defaultValue: None isNullable: False |

TABLE 2-continued

| Attribute Name | Documentation and Allowed Values | Properties |
|---|---|---|
| CLComponentOutputs | It describes the outputs of the CLComponent, as an array for which each entry is one output allowedValues: Not Applicable | type: Object multiplicity: 1 isOrdered: False isUnique: False defaultValue: None isNullable: False |
| CLComponentState | It describes the administrative state of the CL component. allowedValues: "Active", "Inactive", | type: ENUM multiplicity: 1 isOrdered: F isUnique: F defaultValue: None isNullable: False |

The CLComponentProfile of a CL component may comprise descriptions of some or all the characteristics of the CL component, such as descriptions of the roles, descriptions of inputs, descriptions of outputs, descriptions of capabilities, descriptions of data formats, etc.

The operator may read the CLComponentProfile of a CL component in order to understand the operation of the CL component and how it may be combined with another CL component. The entries in the CLComponentProfile may include one or more attributes listed in Table 3 whose definition is provided in Table 4.

TABLE 3

| Attribute Name | Support Qualifier | isReadable | isWritable | isInvariant | isNotifyable |
|---|---|---|---|---|---|
| CLComponentName | M | T | F | T | T |
| CLComponentDescription | O | T | F | T | T |
| CLComponentType | M | T | F | T | T |
| CLComponentOperations | O | T | F | T | T |
| CLComponentInputDescription | O | T | F | T | T |
| CLComponentOutputDescription | O | T | F | T | T |

TABLE 4

| Attribute Name | Documentation and Allowed Values | Properties |
|---|---|---|
| CLComponentName | A user-friendly (and user assignable) name of the input parameter. allowedValues: Not Applicable | type: String multiplicity: 1 isOrdered: False isUnique: False defaultValue: None isNullable: False |
| CLComponentDescription | It holds a description of the CLComponent allowedValues: Not Applicable | type: String multiplicity: 1 isOrdered: False isUnique: False defaultValue: None isNullable: False |
| CLComponentType | It describes the type of capabilities supported by the CLComponent allowedValues: Not Applicable | type: String multiplicity: 1 isOrdered: False isUnique: False defaultValue: None isNullable: False |
| CLComponentOperations | It holds a description of kinds of operations undertaken by the CLComponent allowedValues: Not Applicable | type: String multiplicity: 1 isOrdered: False isUnique: False defaultValue: None isNullable: False |

TABLE 4-continued

| Attribute Name | Documentation and Allowed Values | Properties |
|---|---|---|
| CLComponentInputsDescription | It holds a description of the inputs to the CLComponent, allowedValues: Not Applicable | type: Object multiplicity: 1 isOrdered: False isUnique: False defaultValue: None isNullable: False |
| CLComponentOutputsDescription | It holds a description of the outputs of the CLComponent, allowedValues: Not Applicable | type: Object multiplicity: 1 isOrdered: False isUnique: False defaultValue: None isNullable: False |

Although the requirements for the interfaces of the CL components may be different depending on the characteristics of the CL components, they may be implemented using the same APIs. Specifically, the interfaces for the CL components may comprise a control interface and an exposure interface.

The control interface may be used to configure the CL components. The control interface may be implemented using a provisioning management service produced by the CL components and consumed by the CLC. The respective details for each CL component may be implemented as in Table 5.

TABLE 5

| CL component/ MnS Producer | Capability | Consumer |
|---|---|---|
| Data collection | Configure data collection characteristics for data | CLC - configures the data collection attributes |
| | Configure a PM job on the component to deliver PM data to the CLC | CLC - configures the PM job on the DC component |
| | Configure a data reporting job on the component to deliver data to the analytics component | CLC - configures the data reporting job on the DC component |
| Analytics | Configure behavior characteristics of the analytics | operator- configures the Analytics attributes |
| | Configure a PM job on the component to deliver PM data to the CLC | CLC- configures the PM job on the Analytics component |
| | Configure a data reporting job on the component to deliver the analytics report to the decision component | CLC- configures the data reporting job on the Analytics component |
| Decision | Configure behavior characteristics of the decision making | operator- configures the decision attributes |
| | Configure relative importance of different decisions or goals | Operator may configure the decision attributes |
| | Configure a PM job on the component to deliver PM data to the CLC | CLC- configures the PM job on the decision component |
| | Configure a data reporting job on the component to deliver recommended actions to the Execution component | CLC- configures the data reporting job on the decision component |
| Execution | Configure behavior characteristics of the execution | operator- configures the execution attributes |
| | Configure a PM job on the component to deliver PM data to the CLC | CLC- configures the PM job on the execution component |
| | Configure the component to implement provisioning management to execute actions on the network | CLC- configures the data collection job on the execution component |

The exposure interface may be used to collect and expose operational data from the CL components to the CLC. The exposure interface may be implemented using the file data reporting or streaming data reporting APIs as described in TS 28.532. Therein the service is produced by the CL components and consumed by the CLC. The respective details for each CL component may be implemented as in Table 6.

TABLE 6

| CL Component | Capability | Producer | Consumer |
|---|---|---|---|
| Data collection | Provide information to the CLC about the status and performance of data collection jobs | Data Collection Component emits the report | CLC |
| Analytics | Provide information to the CLC about the status and performance of analytics jobs or processes | Analytics Component emits the report | CLC |
| Decision | Provide information to the CLC about the performance of data collection jobs | Decision Component emits the report | CLC |
| Execution | Provide information to the CLC about the status of execution jobs towards the resources | Execution Component-emits the report | CLC |

FIG. 14 shows a block diagram of a method for instantiating a CL for managing a communication system performed by a CLC.

In step 1400, a CLC may receive a request from an operator to instantiate a CL for managing a communication system.

In step 1402, the CLC may identify CL components based on the request.

In step 1404, the CLC may instantiate a CL for managing a communication system with the CL components.

The request may indicate unique identifiers of the CL components.

The unique identifiers of the CL component may comprise unique names of the CL components.

The request may indicate roles of the CL components. The roles may comprise collecting data, analysing data, making a decision and/or executing a decision.

The request may indicates capabilities of the CL components. The capabilities may comprise reading data relating to a managed object from the object or a network database and format the data and/or making a prediction based on formatted data.

The request may comprise inputs of the CL components and/or outputs of the CL components.

The request may comprise performance metrics of the CL components or the CL for managing the communication system.

Instantiating the CL for managing the communication system with the CL components may comprise: composing the CL for managing the communication system with the CL components; configuring the CL components; configuring the relations between the CL components; and/or configuring the CL for managing the communication system as active.

Configuring the relations between the CL components may comprise connecting the CL components.

Configuring the CL for managing the communication system may comprise: activating the CL components; and/or marking the CL for managing the communication system as active.

The CLC may send, to the operator, a notification indicating that the CL for managing the communication system has been instantiated. Alternatively, the CLC may send, to the operator, a notification indicating that the CL for managing the communication system has not been instantiated.

Identifying the CL components is further based on a repository storing identifiers of CL components, roles of the CL components, capabilities of the CL components, inputs of the CL components, outputs of the CL components and/or performance metrics of the CL components.

The CL components may originate from different vendors.

The CL components may operate on different systems of the network.

The CLC may be an automation platform or may be part of an automation platform.

FIG. 15 shows a schematic representation of non-volatile memory media 1500 storing instructions and/or parameters which when executed by a processor allow the processor to perform one or more of the steps of the method of FIG. 14.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 14, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus, comprising:
   at least one processor; and
   at least one memory storing instruction that, when executed by the at least one processor, cause the apparatus to perform:
   receiving a request from an operator to instantiate a closed loop for managing a communication system, wherein the request indicates capabilities of the closed loop components, and the capabilities comprise making a prediction based on formatted data, wherein the capabilities further comprise reading data relating to a managed object from the object or a network database and format the data;
   identifying closed loop components based on the request; and
   instantiating a closed loop for managing a communication system with the closed looped components.

2. The apparatus of claim 1, wherein the request indicates unique identifiers of the closed loop components.

3. The apparatus of claim 1, wherein the request indicates roles of the closed loop components.

4. The apparatus of claim 3, wherein the roles comprise collecting data, analyzing data, making a decision, and/or executing a decision.

5. The apparatus of claim 1, wherein the request comprises inputs of the closed loop components and/or outputs of the closed loop components.

6. The apparatus of claim 1, wherein the request comprises performance metrics of the closed loop components or the closed loop for managing the communication system.

7. The apparatus of claim 1, wherein instantiating the closed loop for managing the communication system with the closed loop components comprises:
   composing the closed loop for managing the communication system with the closed loop components;
   configuring the closed loop components;
   configuring the relations between the closed loop components; and/or
   configuring the closed loop for managing the communication system as active.

8. The apparatus of claim 1, wherein the at least one memory and instructions, with the at least one processor, are further configured to cause the apparatus to perform:
   sending, to the operator, a notification indicating that the closed loop for managing the communication system has been instantiated; or
   sending, to the operator, a notification indicating that the closed loop for managing the communication system has not been instantiated.

9. The apparatus of claim 1, wherein identifying the closed looped components is further based on a repository storing identifiers of closed looped components, roles of the closed loop components, capabilities of the closed loop components, inputs of the closed loop components, outputs of the closed loop components and/or performance metrics of the closed loop components.

10. The apparatus of claim 1, wherein the closed loop components originate from different vendors.

11. The apparatus of claim 1, wherein the apparatus comprises a closed loop control.

12. A method, comprising:
   receiving a request from an operator to instantiate a closed loop for managing a communication system, wherein the request indicates capabilities of the closed loop components, and the capabilities comprise making a prediction based on formatted data, wherein the capabilities further comprise reading data relating to a managed object from the object or a network database and format the data;
   identifying closed loop components based on the request; and
   instantiating a closed loop for managing a communication system with the closed looped components.

13. A non-transitory computer-readable medium comprising computer executable instructions stored thereon which, when run on one or more processors perform the steps of the method of claim 12.

14. The method of claim 12, wherein the request indicates unique identifiers of the closed loop components.

15. The method of claim 12, wherein the request indicates roles of the closed loop components.

16. The method of claim 15, wherein the roles comprise collecting data, analyzing data, making a decision, and/or executing a decision.

* * * * *